United States Patent
Williams et al.

(10) Patent No.: US 7,912,247 B2
(45) Date of Patent: Mar. 22, 2011

(54) METHOD OF BORESIGHT CORRELATION OF IMAGER VIDEO TO REFERENCE VIDEO

(75) Inventors: Darin S. Williams, Tucson, AZ (US); Edward N. Kitchen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 255 days.

(21) Appl. No.: 12/259,052

(22) Filed: Oct. 27, 2008

(65) Prior Publication Data

US 2009/0046902 A1 Feb. 19, 2009

Related U.S. Application Data

(62) Division of application No. 10/941,203, filed on Sep. 15, 2004, now Pat. No. 7,463,753.

(51) Int. Cl.
*G06K 9/00* (2006.01)

(52) U.S. Cl. .......................................... 382/103; 348/169

(58) Field of Classification Search .................. 382/100, 382/103, 106, 107, 181, 190, 195, 199, 201, 382/203; 342/52, 53, 141; 250/316.1, 330, 250/336.1, 338.1, 341.8, 342, 495.1; 702/127, 702/135, 134; 348/169
See application file for complete search history.

(56) References Cited

U.S. PATENT DOCUMENTS

| | | | |
|---|---|---|---|
| 3,974,383 A | | 8/1976 | Chapman |
| 5,018,218 A | * | 5/1991 | Peregrim et al. ............... 382/103 |
| 5,052,045 A | * | 9/1991 | Peregrim et al. ............... 382/199 |
| 5,129,595 A | | 7/1992 | Thiede et al. |
| 5,168,529 A | * | 12/1992 | Peregrim et al. ............... 382/199 |
| 5,210,799 A | * | 5/1993 | Rao ............................... 382/103 |
| 5,420,421 A | | 5/1995 | Lindgren et al. |
| 5,619,426 A | | 4/1997 | Hutchens et al. |
| 5,680,487 A | * | 10/1997 | Markandey .................... 382/291 |
| 5,903,659 A | | 5/1999 | Kilgore et al. |
| 5,940,140 A | | 8/1999 | Dadourian et al. |
| 6,243,498 B1 | | 6/2001 | Chen et al. |
| 6,836,320 B2 | | 12/2004 | Deflumere et al. |
| 6,897,446 B2 | | 5/2005 | Chen et al. |
| 2002/0159101 A1 | | 10/2002 | Alderson et al. |
| 2002/0159651 A1 | | 10/2002 | Tener et al. |

FOREIGN PATENT DOCUMENTS

| | | |
|---|---|---|
| EP | 0917103 A | 5/1990 |
| EP | 0986252 A | 3/2000 |
| WO | WO 02067575 | 8/2002 |

* cited by examiner

*Primary Examiner* — Anand Bhatnagar
(74) *Attorney, Agent, or Firm* — Eric A. Gifford

(57) ABSTRACT

The present invention provides for simple and streamlined boresight correlation of FLIR-to-missile video. Boresight correlation is performed with un-NUCed missile video, which allows boresight correlation and NUC to be performed simultaneously thereby reducing the time required to acquire a target and fire the missile. The current approach uses the motion of the missile seeker for NUCing to produce spatial gradient filtering in the missile image by differencing images as the seeker moves. This compensates DC non-uniformities in the image. A FLIR image is processed with a matching displace and subtract spatial filter constructed based on the tracked scene motion. The FLIR image is resampled to match the missile image resolution, and the two images are preprocessed and correlated using conventional methods. Improved NUC is provided by cross-referencing multiple measurements of each area of the scene as viewed by different pixels in the imager. This approach is based on the simple yet novel premise that every pixel in the array that looks at the same thing should see the same thing. As a result, the NUC terms adapt to non-uniformities in the imager and not the scene.

15 Claims, 11 Drawing Sheets

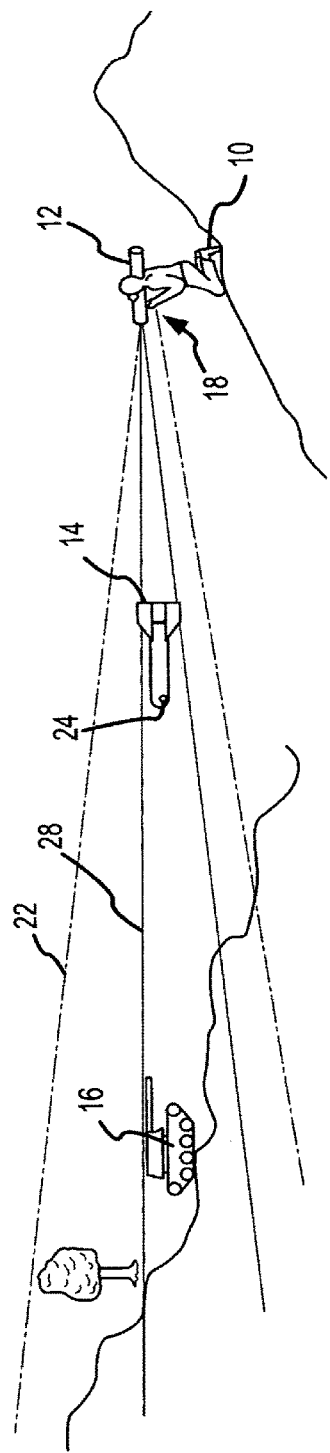
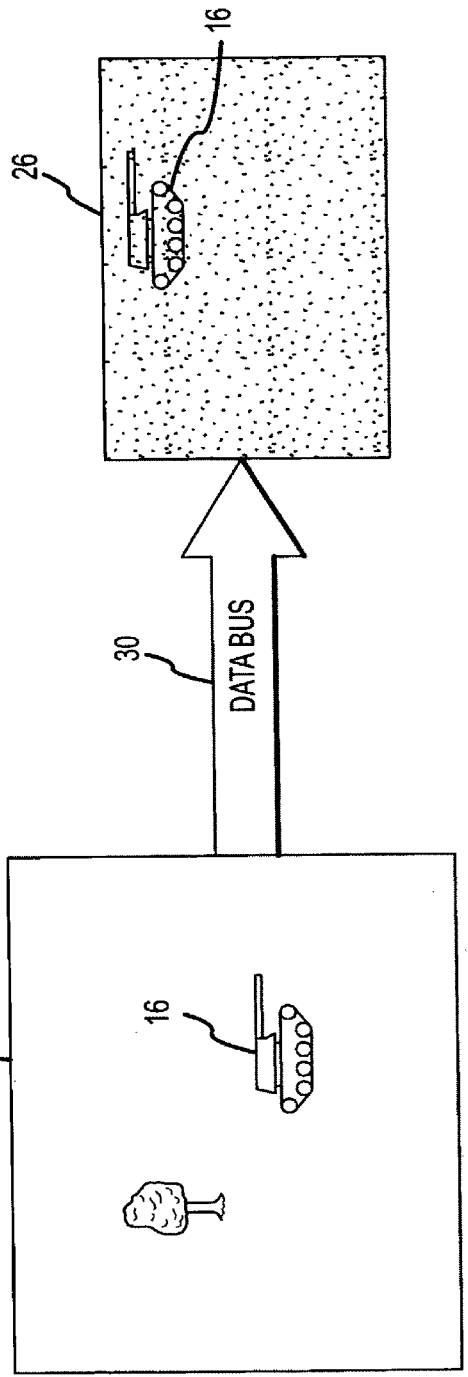
FIG. 1 (PRIOR ART)
FIG. 2 (PRIOR ART)

METHOD OF BORESIGHT CORRELATION OF IMAGER VIDEO TO REFERENCE VIDEO

CROSS-REFERENCE TO RELATED APPLICATIONS

This application is a divisional and claims the benefit under 35 U.S.C. Section 121 of the following co-pending and commonly-assigned U.S. utility patent application, which is incorporated by reference herein: U.S. patent application Ser. No. 10/941,203, entitled "FLIR-TO-MISSILE BORESIGHT CORRELATION AND NON-UNIFORMITY COMPENSATION OF THE MISSILE SEEKER", by Darin Williams et al, filed on Sep. 15, 2004.

BACKGROUND OF THE INVENTION

1. Field of the Invention

This invention relates to the boresight correlation and non-uniformity compensation that must occur before target handover from the FLIR to the missile seeker, and more specifically to a method of correlating un-NUCed missile video to the FLIR and an improved scene based method of non-uniformity compensation.

2. Description of the Related Art

In guided missile systems, certain calibrations must be performed before target handover from the target designation device such as a forward looking infrared (FLIR) to the missile seeker. These include performing a boresight correlation to correct for any imprecise mechanic alignments between the FLIR and missile seeker and performing a non-uniformity compensation to reduce pixel-to-pixel response non-uniformities in the seeker's IR imager. These adjustments improve the missile's chance of acquiring and then tracking the target to impact.

As shown in FIGS. 1 and 2, a soldier 10 uses a shoulder launched missile system 12 to target and launch a missile 14 to destroy a tank 16. The missile system is provided with a forward looking infrared (FLIR) system 18 that includes a high resolution imager that acquires a high resolution image 20 of the scene within its FOV 22. The missile 14 is outfitted with a missile seeker 24 having a low resolution imager that acquires a low resolution image 26 of the scene within its FOV 28. The FLIR and missile seeker communicate information over a channel such as a data bus 30. As illustrated, the FLIR and seeker's FOVs are not aligned and the non-uniformity of the IR imager is such as to almost completely obscure the tank 16 within the low resolution image 26.

Automated systems of performing boresight correlation have been in the field for decades, e.g. LANTIRN. Substantial knowledge has been acquired concerning robust approaches, for example, edge pre-filtering and masked bi-level correlation for textured scenes, with spot-feature based correlation for bland scenes. However, these methods require a relatively uniform response across the missile seeker image. In a ground-to-ground missile, image uniformity is achieved by completely cooling down and non-uniformity compensating the seeker's IR imager before boresight correlation begins. Once all three serial operations are completed and the data handed over to the missile seeker, the soldier will see seeker video with minimal noise and centered on his FLIR video. This requires time, which exposes the soldier to enemy fire and endangers the mission of destroying the target.

Although non-uniformity compensation ("NUCing") is required to provide images of sufficient quality to perform boresight correlation, its primary function is to reduce the fixed-pattern noise level of missile IR video for acquisition by the soldier and possibly during tracking post-launch. NUC is required because the response of the IR imager on a pixel by pixel basis can change dramatically over time and based on environmental and operating conditions. The NUC procedure should be effective at removing or at least substantially reducing the pixel-to-pixel variability in the response of the imager, should be done quickly and should require minimal operator involvement ("knob tweaking").

The predominant approach for NUCing uses a blurred version of the scene created optically, through motion of the IR seeker, or through temporal averaging. The premise is that on-average all pixels should see the same value. Based on this assumption, any high frequency components that are detected in the blurred image for each pixel are deemed to be the result of non-uniform pixel response. The blurred image is corrected to remove the high frequency components. The same correction is then applied to the subsequent non-blurred image. This approach is serviceable for relatively "flat" imagery but struggles with scenes which contain significant content at high spatial frequencies. These may be perceived as non-uniformities and "compensated" producing scene and body-motion dependent artifacts.

Once NUCing is complete and missile video with a low enough noise level is available, boresight correlation can be performed to correct any misalignment between the missile and FLIR. Boresight correlation is typically performed by first resampling the FLIR image to a coarser resolution to match the seeker's resolution. Next, the NUCed missile image is sent across the data bus and correlated against the re-sampled FLIR image. The correlation process is well known to those skilled in the art. The position of the correlation peak indicates the position of the center of the missile image relative to the FLIR's boresight (center of the FLIR's field of view). Once this relative boresight offset is known, the target position and size from the FLIR can then be mapped into the missile image.

To improve the effectiveness of these weapons systems and to protect the soldiers, techniques for simplifying and streamlining the boresight correlation are needed. Furthermore, techniques for NUC that provide higher bandwidth, improved noise reduction and minimum user involvement that is applicable to severely non-uniform scenes would further improve the efficacy of the weapons system and other IR imaging systems.

SUMMARY OF THE INVENTION

The present invention provides for simple and streamlined boresight correlation of FLIR-to-missile video and for higher bandwidth, higher SNR, user friendly NUC of IR imagers. The NUC process also provides the capability of displaying enhanced imagery.

This is accomplished in part with a method that performs boresight correlation with un-NUCed missile video. This allows bore sight correlation and NUC to be performed simultaneously thereby reducing the time required to acquire a target and fire the missile. The current approach uses the motion of the missile seeker for NUCing to produce spatial gradient filtering in the missile image by differencing images as the seeker moves. This compensates DC non-uniformities in the image. Although there are residual artifacts from scene content and gain non-uniformities, they are not sufficiently severe to interfere with correlation when proper pre-filtering is used. A FLIR image is processed with a matching displace and subtract spatial filter constructed based on the tracked scene motion. The FLIR image is resampled to match the missile image resolution, and the two images are preprocessed and correlated using conventional methods.

Although this method of boresight correlation can be used in tandem with conventional techniques for NUC, additional advantages of increased bandwidth, improved SNR of the missile video and less operator involvement can be realized with improved scene-based NUC. The current approach works by cross-referencing multiple measurements of each area of the scene as viewed by different pixels in the imager. This approach is based on the simple yet novel premise that every pixel in the array that looks at the same thing should see the same thing. As a result, the NUC terms adapt to non-uniformities in the imager and not the scene.

In scene-based NUC, a sequence of temporal images from the missile video are captured and compensated with apriori NUC terms assuming they exist. The FOV motion across the scene is tracked and the compensated images are registered and summed together to form a "registered sum image". A "registered count image" records the number of pixels (or the total pixel weights) contributing to each pixel in the registered sum image. A "registered average image" is created by dividing the "registered sum image" by the "registered count image". This image constitutes the best available estimate of the actual scene content. The image is, to some extent, contaminated by uncompensated non-uniformities but these will be cancelled. The "registered average image" is backward mapped by cutting out frames from the collage that correspond to each of the input images to produce estimates of the ideal input image, e.g. assuming perfect NUC. Each of the estimates is subtracted from the respective compensated image to create a sequence of "unexplained difference" images. An Nth order correlation of these differences against the input images produces a pixel-by-pixel estimate of NUC terms needed to correct any remaining uniformities. These NUC terms are combined with any a priori NUC terms, e.g. factory calibration or terms resulting from prior iterations, and used to compensate the missile video. In the case of simple DC offset compensation, this combination is a simple sum. Typically, the process will iterate a number of times to beat down the noise level. The number of iterations can be fixed, based on convergence criteria of the NUC terms or on time allowed the imaging system.

This process can be enhanced by keeping track of the variability in the forward mapping (creating the registered average image) and/or backward mapping (estimating the ideal input images) and weighting those imager and or scene pixels with less variability more heavily. This has the effect of favoring those imager pixels (camera pixels) with the most consistent response for estimating scene content during the "forward mapping", and of favoring those areas of the scene (scene pixels) which are most spatially and temporally consistent in estimating pixel responses during "backward mapping". Spatial consistency enters in to this variability through aliasing in the backward mapping: spatially consistent areas produce less aliasing, hence less variability in the backward mapping.

The process can also be enhanced by storing the registered average image at greater than the seeker pixel resolution. Specifically, use of simple nearest neighbor mapping (vs. interpolation) to expand the number of pixels in the FOV has proven quite beneficial. Phase variations in the input images cause aliased frequency components from the replication to cancel while aliasing artifacts that are consistent with the actual beyond-Nyquist frequencies in the input image add constructively and are preserved. Anti-aliased interpolation methods for creating the enlarged scene tend to diminish this desirable effect.

The process can be computationally simplified if the variability is not tracked and the non-uniformity of the imager is assumed to be zero order, e.g. just the offset. In this case, the individual frames need not be retained to support the computational iteration, only the stacked average, the registered sum, and the registered count images (the latter being fixed throughout the iterations) are required. Ideal stacked averages are computed by convolving the FOV motion trace (f) against the registered average image, residual non-uniformities are identified by differencing this with the input stacked average, and residual differences (DC non-uniformity estimates) are propagated into the registered average image by correlating them against the FOV motion trace (f) and adding the incremental result into the registered sum.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1, as described above, is a block diagram of a FLIR and missile system;

FIG. 2, as described above, illustrates a frame of FLIR video and a frame of un-NUCed missile video prior to boresight correlation;

DETAILED DESCRIPTION OF THE INVENTION

The present invention provides for simple and streamlined boresight correlation of FLIR-to-missile video and for higher bandwidth, higher SNR, user friendly NUC of IR imagers.

Figure 3:
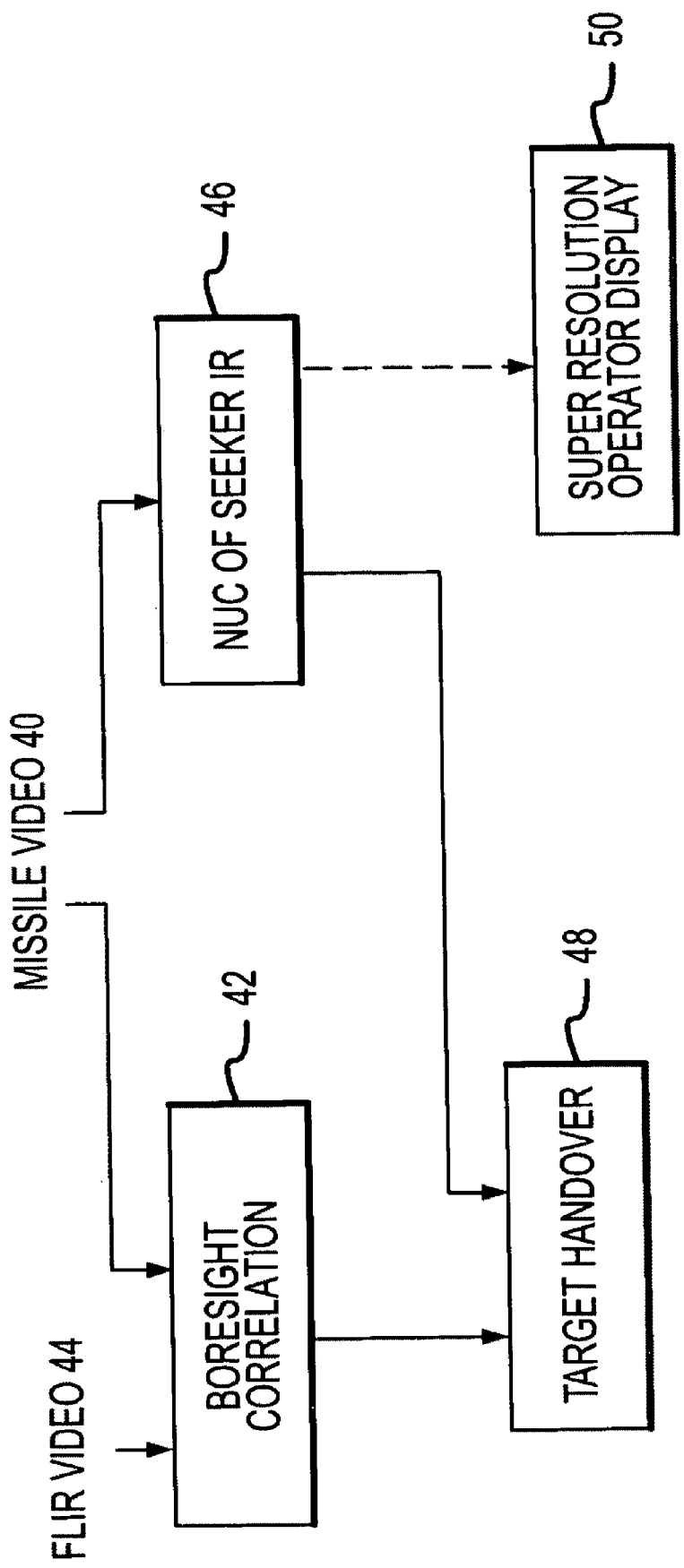
FIG. 3 is a block diagram of a parallel process of non-uniformity compensation and boresight correlation for target handover in accordance with the present invention.

As shown in FIG. 3, this is accomplished in part with a method that performs boresight correlation with un-NUCed missile video 40. This allows boresight correlation 42 with the FLIR video 44 and NUC 46 on the missile video 40 to be performed simultaneously thereby reducing the time required to perform target handover 48 from the FLIR to the missile seeker and fire the missile. NUC is not required for target handover, however it is useful to improve the SNR of the missile video. The NUC process also provides the capability of displaying enhanced, e.g., noise filtered and super resolved, imagery on an operator display 50.

The current approach to boresight correlation temporally processes the missile video from the IR imager to locate edges in an IR image, spatially processes the FLIR video in accordance with an estimate of the scene motion to locate at least some of the same edges in a FLIR image, and correlates the missile and FLIR images. More specifically, seeker motion converts spatial edges in an image into temporal signatures in a sequence of images. The signatures are used to detect the edges using, for example, frame differencing. The FLIR video is processed spatially in accordance with scene motion using, for example, a displace and subtract filter, to locate at least some of the same edges in a FLIR image. The missile and FLIR images (edge maps) are correlated to provide boresight correlation.

Figure 4:
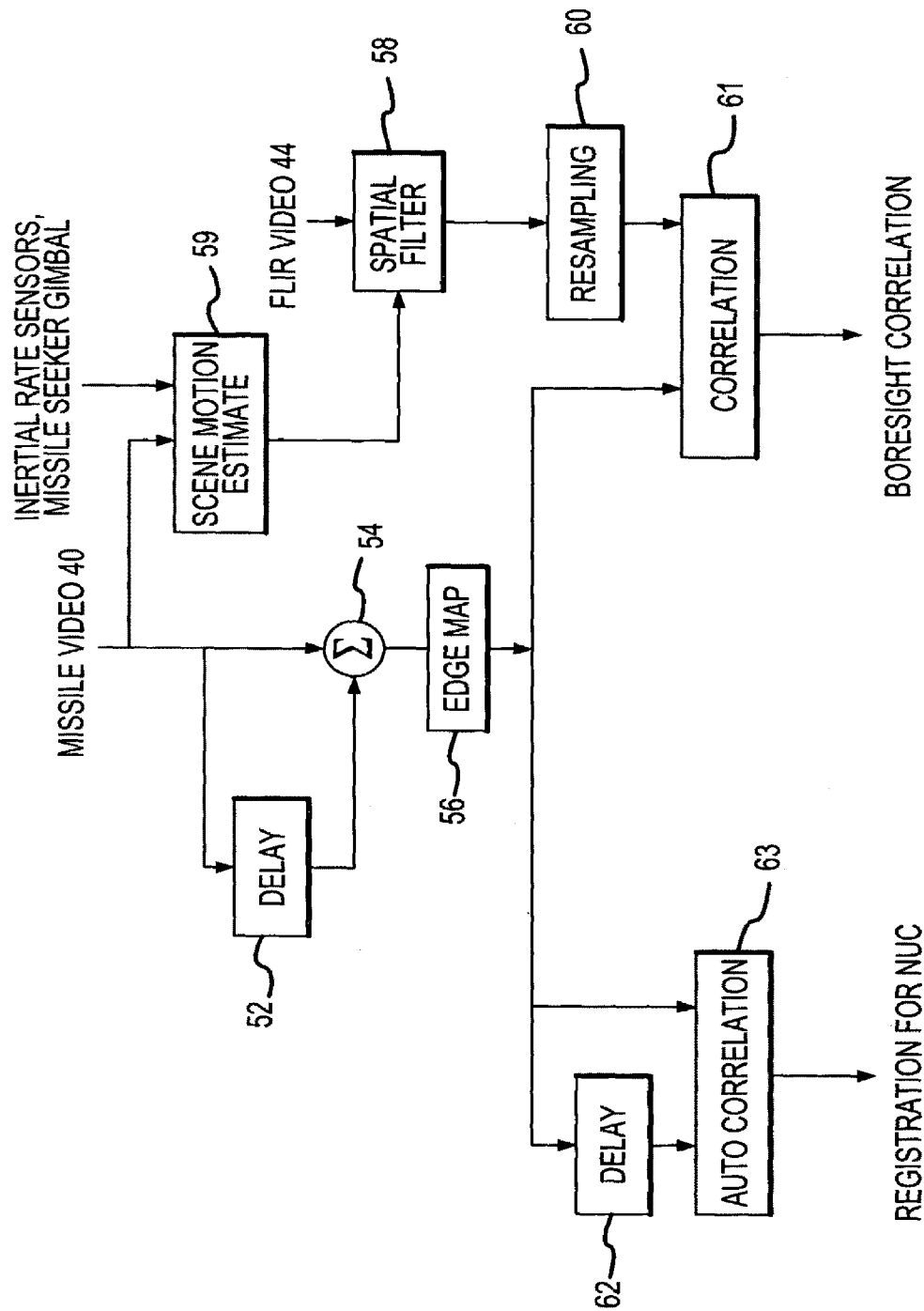
FIG. 4 is a block diagram of boresight correlation using un-NUCed missile video and auto correlation of the un-NUCed missile video.

As shown in FIG. 4, in an exemplary embodiment successive images (frames of missile video 40) are delayed 52 and subtracted 54 from the next image to form an edge map 56. This cancels DC non-uniformities in the image. Although there are residual artifacts from scene content and gain non-uniformities, they are not sufficiently severe to interfere with correlation when proper pre-filtering is used. Higher order differences can be formed to improve the edge map at the cost of additional computing complexity. A FLIR image (frame of FLIR video 44) is processed with a matching displace and subtract spatial filter 58 constructed based on a scene motion estimate 59 from, for example, gimbal position of the missile seeker and integrated inertial rate sensors and/or autocorrelation of the missile video. The FLIR image is resampled 60 to match the missile image resolution, and the two images are preprocessed and correlated 61 using conventional methods. The missile images (edge maps) are delayed 62 and autocorrelated 63 with the next missile image to provide registration for NUC. By extracting the registration from the edge map rather than waiting for the boresight correlation to determine registration, NUC can be performed simultaneously with boresight correlation thereby reducing the time required to perform target handover.

Although this method of boresight correlation can be used in tandem with conventional techniques for NUC, additional advantages of increased bandwidth, improved SNR of the missile video and less operator involvement can be realized with improved scene-based NUC. The current approach as illustrated in FIGS. 5-8 works by cross-referencing multiple measurements of each area of the scene as viewed by different pixels in the imager. This approach is based on the simple yet novel premise that every pixel in the array that looks at the same thing should see the same thing. As a result, the NUC terms adapt to non-uniformities in the imager and not the scene.

Figure 5:
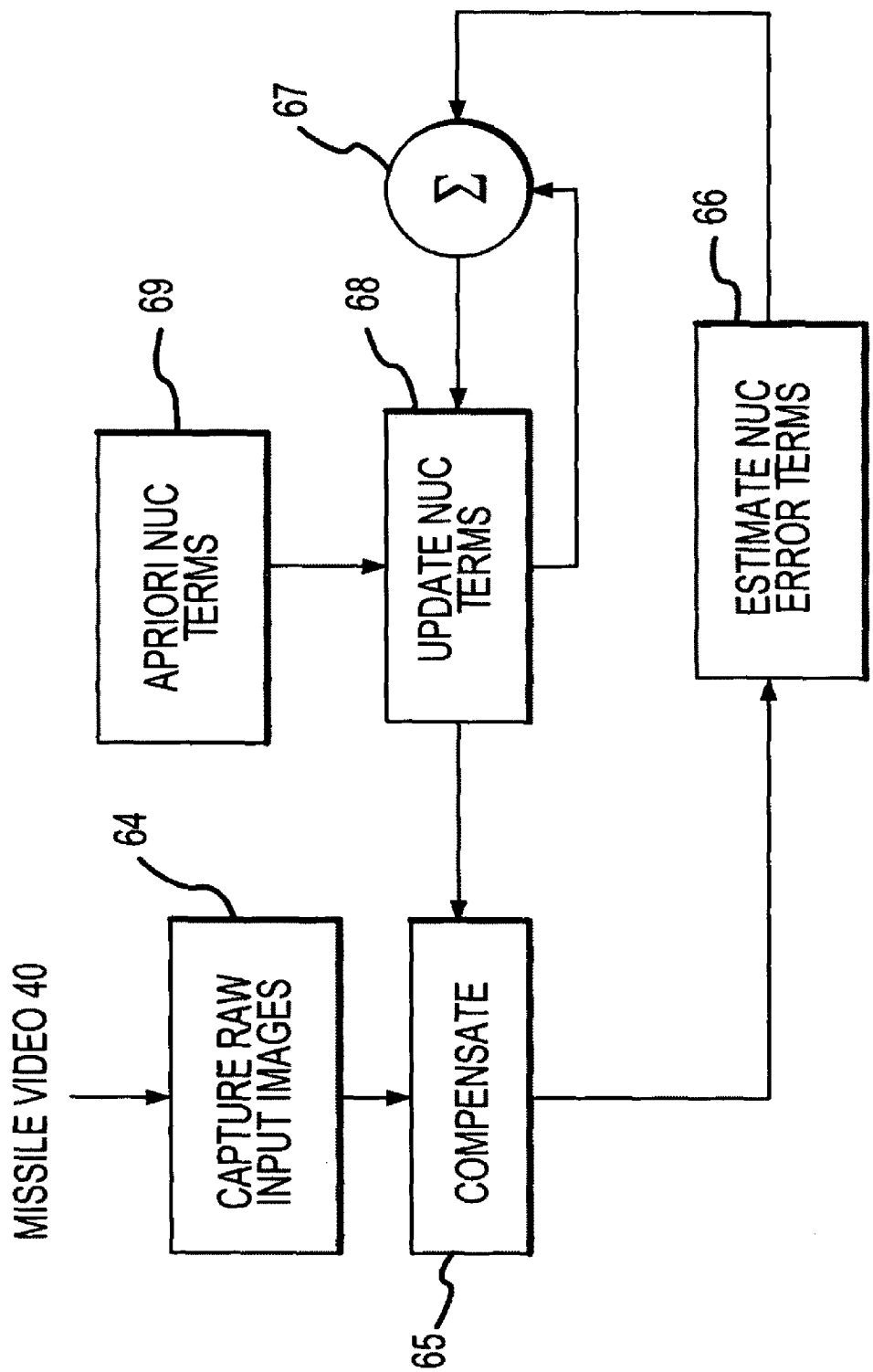
FIG. 5 is a diagram of an iterated NUC process.

As shown in FIG. 5, the basic flow diagram for NUC is to capture raw input images of the missile video (step 64), compensate each frame on a pixel-by-pixel basis using the most recent NUC terms (step 65) and estimate NUC error terms (step 66) based on the compensated images. The NUC error terms are combined with the current NUC terms (step 67) to update the NUC terms (step 68) that are used for the next iteration. The NUC terms may be initialized with a priori NUC terms (factory calibration) (step 69). Typically, the process will iterate a number of times on the compensated images to beat down the noise level. The number of iterations can be fixed, based on convergence criteria of the NUC terms or on time allowed by the imaging system.

Figure 6:
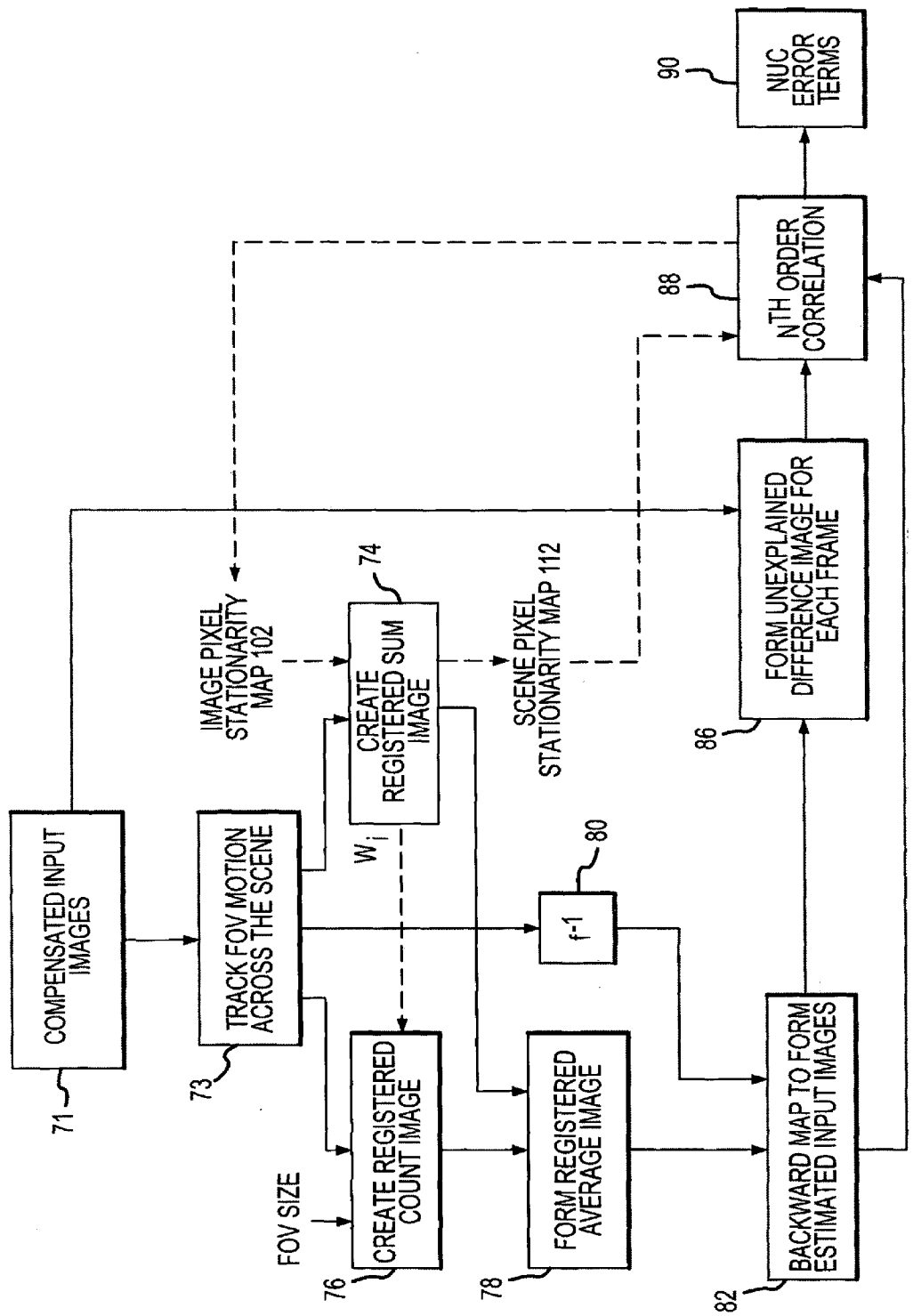
FIG. 6 is a flowchart for estimating the NUC error terms.
Figure 7A:
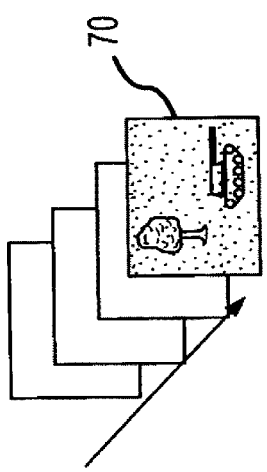
FIGS. 7a through 7f are illustrations of estimation process.
Figure 7C:
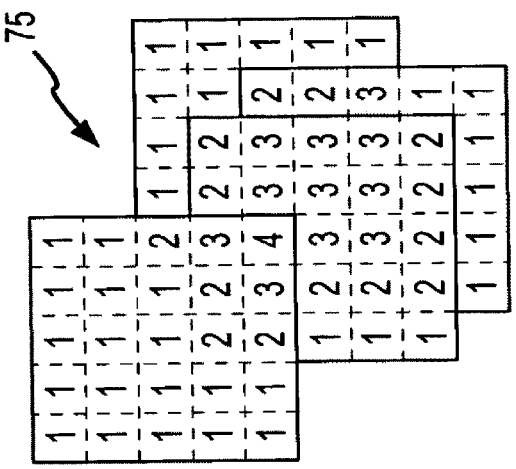
Figure 7B:
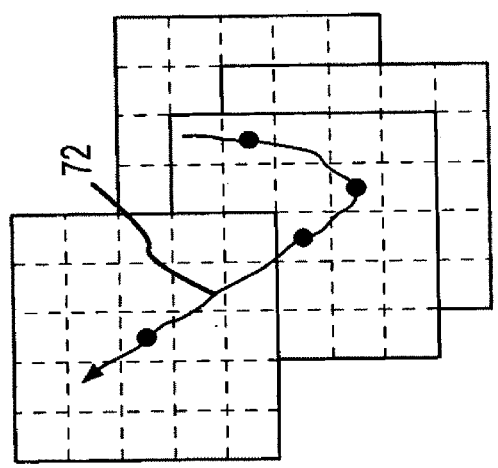
Figure 7F:
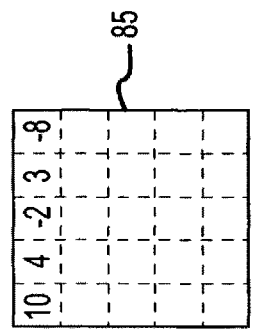
Figure 7D:
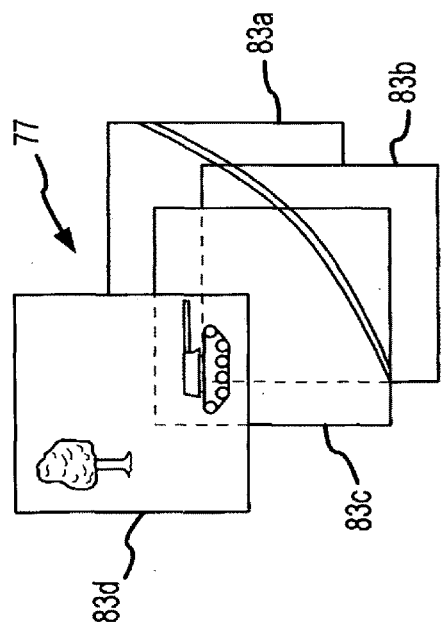
Figure 7E:
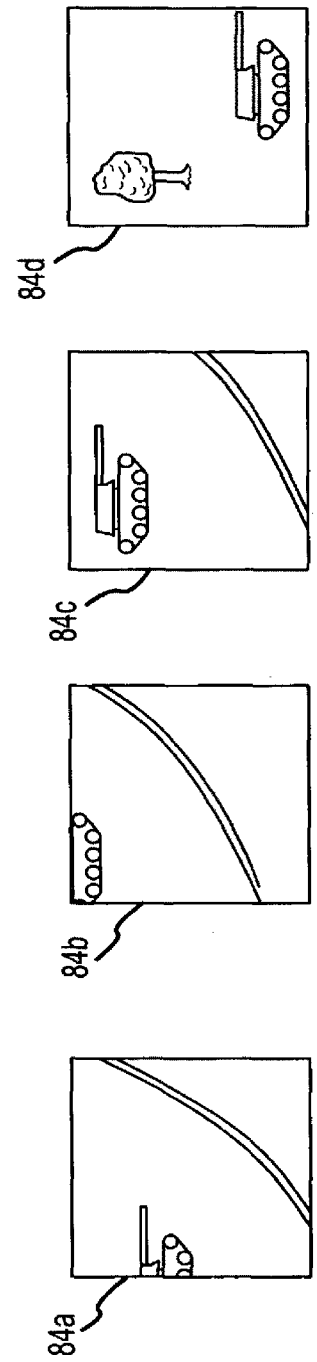

As shown in FIGS. 6 and 7, the NUC error terms are estimated by providing the sequence of compensated images 70 from the missile video (step 71) and tracking the associated FOV motion (f) 72 across the scene (step 73). The images are registered using the FOV motion and summed together to form a "registered sum image" (step 74). A "registered count image" 75 records the number of pixels (or, as described below, the total pixel weights) contributing to each pixel in the registered sum image (step 76). A "registered average image" 77 is created by dividing the "registered sum image" by the "registered count image" (step 78). This image constitutes the best available estimate of the actual scene content. The image is, to some extent, contaminated by uncompensated non-uniformities but these will be cancelled. Together steps 73, 74,76 and 78 constitute the "forward mapping". Using the scene motion across the FOV ($f^1$) 80, the registered average image 77 is "backward mapped" (step 82) by cutting out frames 83a, 83b, 83c, and 83d from the collage that correspond to each of the input images to produce estimates 84a, 84b, 84c, and 84d of the ideal input image, e.g. assuming perfect NUC. Each of the estimates is subtracted from the respective previously compensated image 70 to create a sequence of "unexplained difference" images 85 (step 86). An Nth order correlation (step 88) of these difference images 85 against the respective estimated images produces a pixel-by-pixel estimate of NUC error terms 90 needed to correct any remaining uniformities. In the case of a $0^{th}$ order correlation, (assuming only DC offset, no gain terms), the difference images 85 are simply averaged pixel-to-pixel without reference to the input images. In this particular embodiment, incremental errors in the NUC are accumulated at each iteration. Particularly for $0^{th}$ order (DC compensation) it may be preferable to reference back to the original images instead of the iteratively compensated images so that the complete NUC term is calculated at each iteration instead of a NUC error term.

This process can be enhanced by keeping track of the variability in the forward mapping (creating the registered average image) and/or backward mapping (estimating the ideal input images) and weighting those imager pixels and/or scene pixels with less variability more heavily. This has the effect of favoring those imager pixels with the most consistent response for estimating scene content during the "forward mapping", and of favoring those areas of the scene (scene pixels) which are most spatially and temporally consistent in estimating pixel responses during "backward mapping". Spatial consistency enters in to this variability through aliasing in the backward mapping: spatially consistent areas produce less aliasing, hence less variability in the backward mapping.

Figure 8:
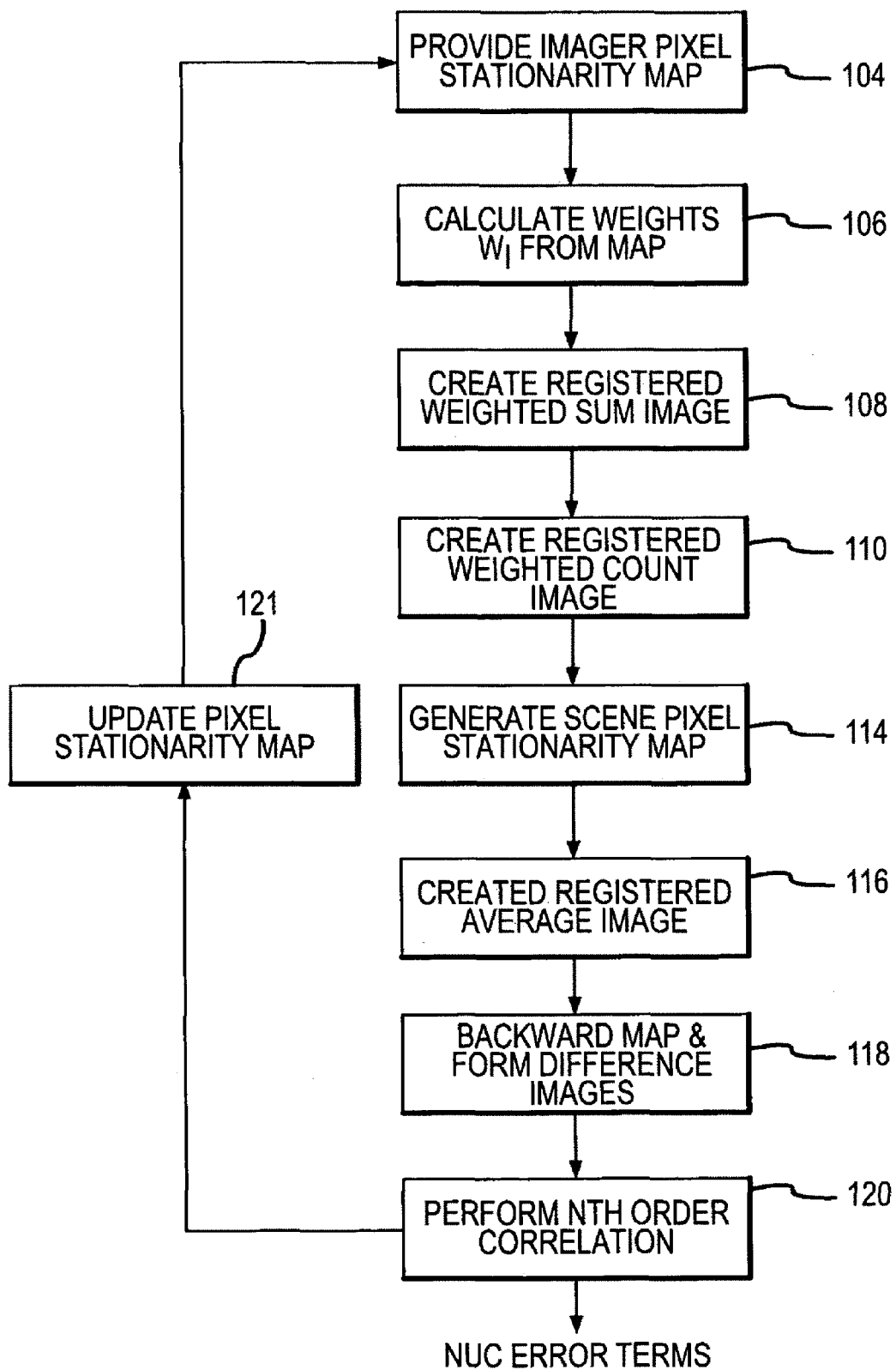
FIG. 8 is a flowchart of an alternate embodiment that tracks variability during the forward and backward mapping processes.

With reference to FIGS. 6 and 8, backward mapping variability is tracked by making an imager pixel stationarity map 102 available (step 104) during the creation of the registered sum image. The map values are a measure of the variability of the response of each pixel in the imager. Pixels that respond consistently will be assigned a small variability and pixels such as "blinkers" that respond inconsistently will be assigned a larger variability. Weights $W_i$ for each imager pixel are then derived from the stationarity map 102 (step 106). For example, if the measure of variability is the variance of the pixel response, the weight is suitably inversely proportional to the standard deviations. It follows that pixels that exhibit a higher degree of stationarity, e.g. a lower variance, are assigned a larger weight and vice-versa. The weights may be biased by adding a constant value to the standard deviation. This is done to keep the weight above the noise level when only a few samples contribute to the pixel. Furthermore, the constant is set to a large enough value to assure convergence to a set of NUC terms. The map, hence the weights are typically but not necessarily initialized to a uniform set of values to start the iterative process. The iterative process will identify the good and bad pixels and the stationary and non-stationary portions of the video, and will rebalance the weights accordingly.

The "registered weighted sum image" is now formed as the weighted sum of the registered image values $I_i$, i.e. ($\Sigma W_i I_i$) for each pixel (step 108). As such, the contribution from "good" pixels is emphasized and the contribution from "bad" pixels is de-emphasized. The weights $W_i$ are also used to form a "registered weighted count image" (step 110) in which each entry corresponding to a scene pixel is the sum of the weights of the contributing imager pixels ($\Sigma W_i$). A scene pixel stationarity map 112 provides a measure of the temporal and spatial stationarity of each scene pixel (step 114). To a lesser but still significant extent, this map also incorporates the effects of bad imager pixels such as "blinkers". This map can be generated by, for example, computing the weighted variance at each scene pixel in the registered sum image, i.e. the weighted variance of the registered imager pixels that contribute to each scene pixel. Assuming an ideal imager pixel response, the scene map accounts for both temporal variations (video) and spatial variations (seeker motion) in the images. Alternately, spatial and/or temporal high pass filtering can be performed on the input images prior to forming the registered sum image to provide local "flatness" estimates. The spatial filters are then constructed with knowledge of the FOV motion.

Figure 9:
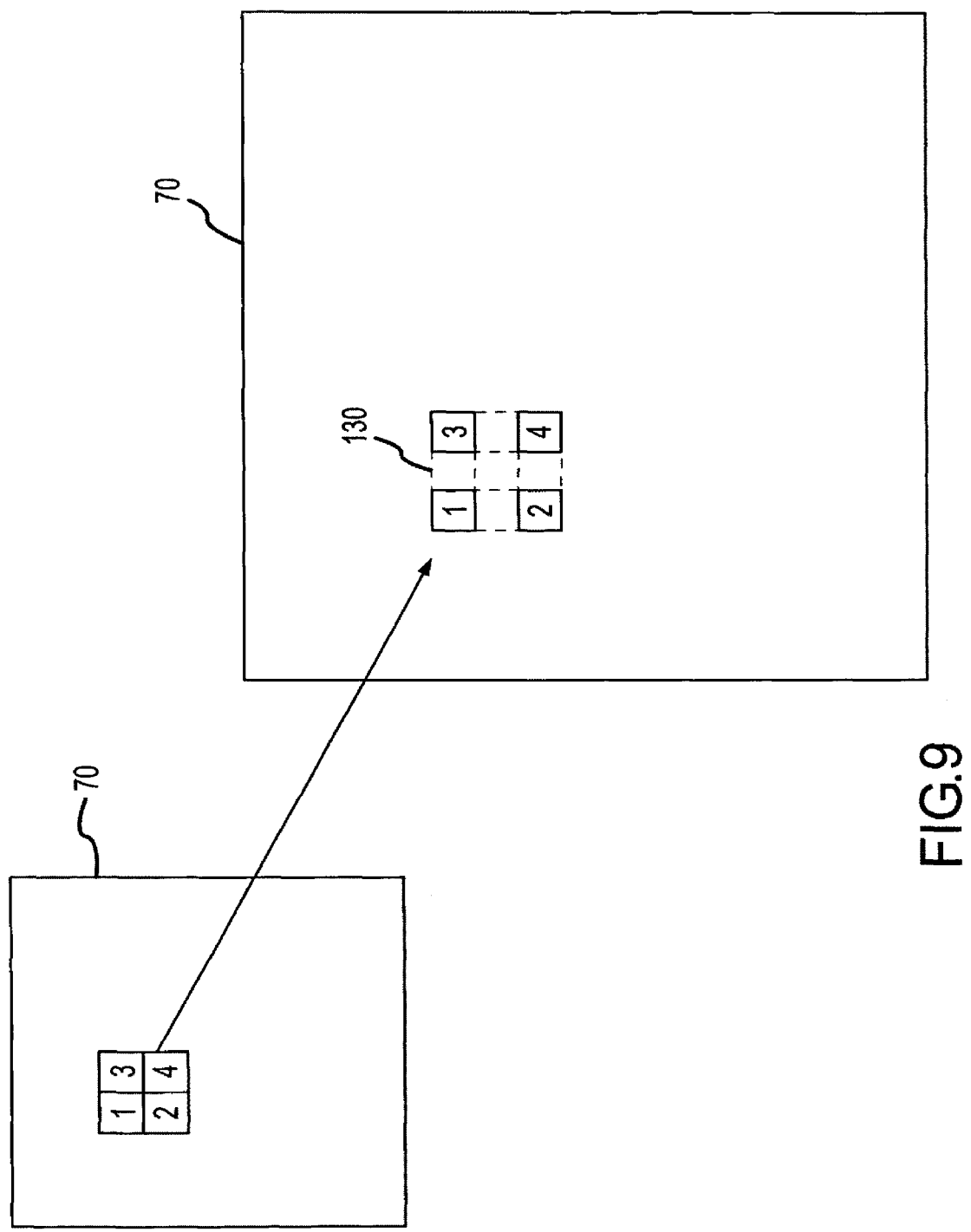
FIG. 9 is a diagram of an alternate embodiment in which the registered average image is stored at greater than seeker pixel resolution.

The registered average image is created by dividing the "registered weighted sum image" by the "registered weighted count image" (step 116). By emphasizing the "good" pixels and de-emphasizing the "bad" pixels, the estimated input images cut out of the collage are better estimates of the ideal input images. The registered average image is backward mapped and the unexplained difference image formed as before (step 118). An Nth order correlation (step 120) of these difference images against the respective estimated images weighted by the scene pixel map 112 produces a pixel-by-pixel estimate of NUC error terms 90 needed to correct any remaining non-uniformities. The imager pixel stationarity map 102 is updated to be the variance of the residual at each pixel after the correlation is performed (step 121). For a zero order system, this defaults to the variance of the unexplained differences at each pixel In another embodiment, as shown in FIG. 9 the NUC estimation process can also be enhanced by storing the registered average image at greater than the seeker pixel resolution. Specifically, each compensated image 70 is upsampled by a factor of 2, 4, 8, etc. and values are assigned to the pixels 130. As a result, the registered sum image, hence registered average image is registered on a pixel level of the upsampled compensated images, which corresponds to sub-pixel resolution of the original images. The use of simple nearest neighbor mapping (vs. interpolation) to assign values to the expanded pixels in the FOV has proven quite beneficial. Phase variations in the compensated images cause aliased frequency components from the replication to cancel while aliasing artifacts that are consistent with the actual beyond-Nyquist frequencies in the input image add constructively and are preserved. Anti-aliased interpolation methods for creating the enlarged scene tend to diminish this desirable effect. Estimating the registered average scene at a higher resolution typically has the effect of improving performance in areas of high spatial frequency content by diminishing aliasing in the backward mapping. It allows sub-pixel registration of the backward mapped images. The corresponding regions (2×2 at 2× resolution) are averaged to produce each backward mapped pixel.

The iterative process can be computationally simplified if the variability is not tracked in either the forward or backward mapping processes and the non-uniformity of the imager is assumed to be zero order, e.g. just the DC offset. In this case, the individual images need not be retained to support the computational iteration, only the stacked average of the raw or apriori compensated images, the registered sum, and the registered count images (the latter being fixed throughout the iterations) are required. Ideal stacked averages are computed by convolving the FOV motion trace (f) against the registered average image (or equivalent correlating against the scene motion across the FOV $f^1$), residual non-uniformities are identified by differencing this with the input stacked average, and residual differences (DC non-uniformity estimates) are propagated into the registered average image by correlating them against the FOV motion trace (f) and adding the incremental result into the registered sum. Since convolution is equivalent to correlating against a reversed mask, one operation collects the portions of the scene seen by each pixel, and one distributes the residual errors from the image to the scene. Since the reference point reverses in these two case (fixed in the imager FOV vs. fixed in the scene), the correlation mask reverses.

Figure 10:
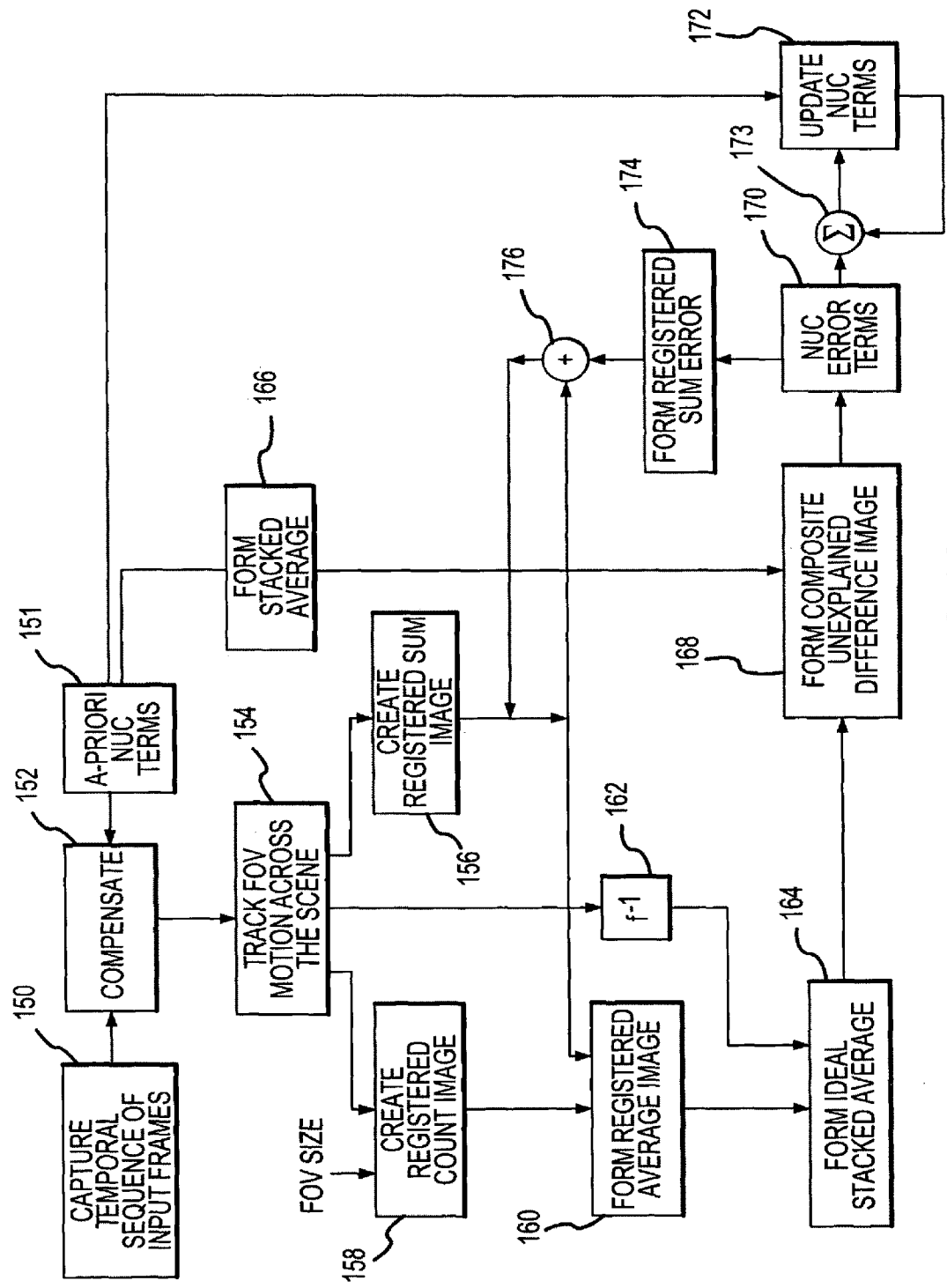
FIG. 10 is a flowchart of a computationally efficient embodiment for a zero order system.

As shown in FIG. 10, NUCing is accomplished by capturing a temporal sequence of input images (step 150), compensating each image using apriori NUC terms 151 (if they exist) such as factory calibration terms (step 152), and tracking the associated FOV motion (f) across the scene (step 154). The images are registered using the FOV motion and summed together to form an initial "registered sum image" (step 156). The number of pixels contributing to each pixel in the registered sum image is recorded in a "registered count image" (step 158). The "registered sum image" is divided by the "registered count image" to form the "registered average image" (step 160). This image constitutes the best available estimate of the actual scene content. The image is, to some extent, contaminated by uncompensated non-uniformities but these will be cancelled.

Up to this point, the NUC process is the same as that originally discussed with respect to FIGS. 5 and 6. By assuming a zero order compensation and forgoing tracking variability, the computational process may be simplified. Instead of having to iterate the entire process, all that is required is an iteration around updating the registered sum image. First, the FOV motion trace f 162 is convolved against the registered average image to form an ideal stacked average (step 164). The ideal stacked average is differenced with a stacked average (average of the compensated images (step 166)) to form a composite unexplained difference image (DC non-uniformity estimates) (step 168). The composite image is output as the NUC error terms 170, which are combined with the updated NUC terms 172 from the previous iteration to form current updated NUC terms 172 (step 173).

Now, instead of having to compensate the input images with the updated NUC terms and create the registered sum image anew, the NUC error terms are simply correlated against the FOV motion trace f to form a registered sum error (step 174) and added to the registered sum image (step 176) to update the registered sum image, which in turn updates the registered average image. This inner loop repeats for a certain number of iterations, time or until the updated NUC terms 172 converge.

Figure 11:
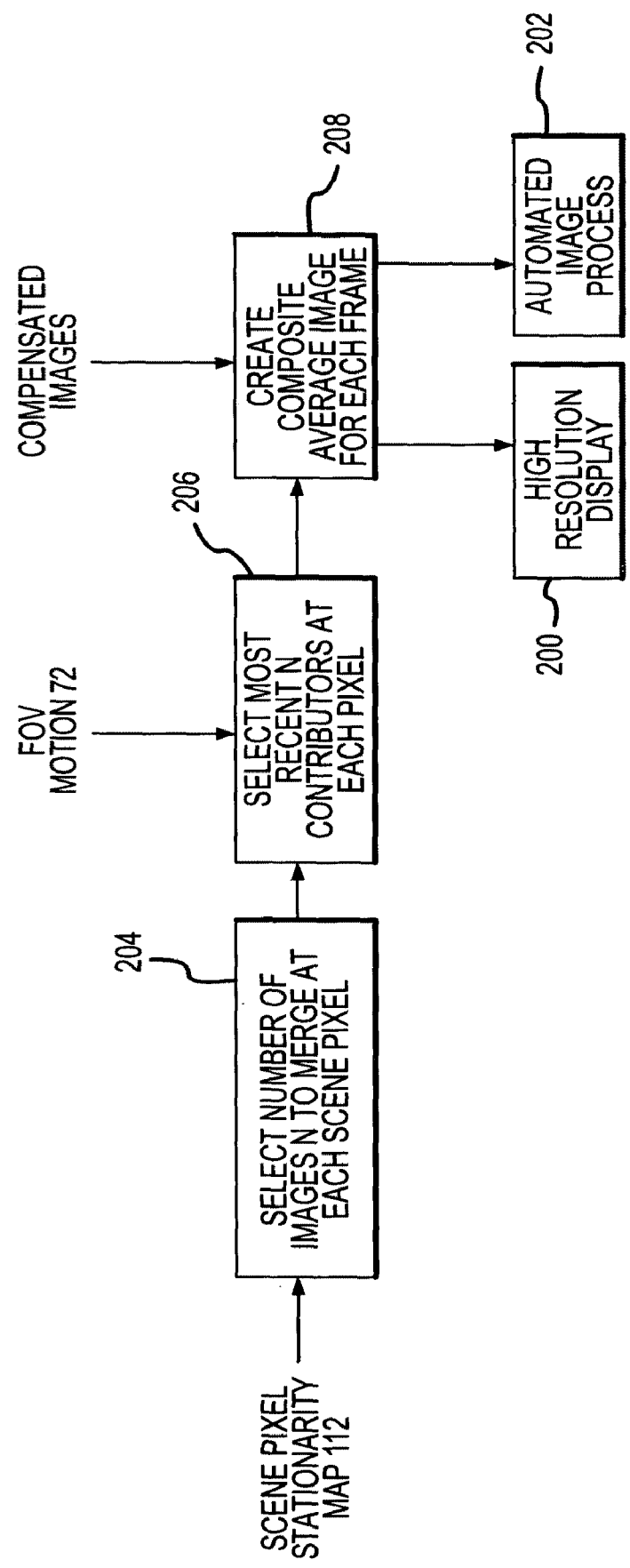
FIG. 11 is a flowchart for using the information provided by NuCing to display an enhanced image.

As shown in FIG. 11, the NUC process also provides the capability of providing enhanced imagery to an operator display 200 or an automated image process 202. For each compensated image, the scene pixel stationarity map 112 is used to select the number of images $N_i$ to merge at each scene pixel (step 204). The more stable the scene pixel the larger $N_i$. Then for each input image frame, the FOV motion 72 is used to select the most recent $N_i$ contributors at each imager pixel (step 206). These two steps essentially determine the width of a temporal averaging filter for each pixel and the motion compensation for each pixel. The filter can be a straight average, weighted average or some higher order filter. Armed with this information, a composite average image is created for each frame from the compensated images (step 208). The composite image is enhanced in two distinct ways. First, in areas of the image that are relatively stable, significant noise reduction is realized by merging a large number of images. Furthermore, in areas of the image that are varying significantly, detail is preserved by merging only a few or no images. Second, particularly in the enhanced resolution method of FIG. 9, the merging of information from adjacent frames can reconstruct scene content in the composite image that was not originally there in that is exceeded the Nyquist limit for an individual frame. Just as a scanning linear array is often used to provide image resolution in the cross axis, moving a two dimensional imager can provide enhanced resolution in both axes.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of correlating video from an imager to reference video, comprising:
    using the temporal motion of the imager over a plurality of frames of video to form a first edge map;
    measuring scene motion of the video;
    spatially processing images in the reference video in accordance with the scene motion to locate at least some of the same edges to form a second edge map; and
    correlating the first and second edge maps to provide registration.

2. The method of claim 1, wherein the first edge map is formed by differencing images in the video.

3. The method of claim 2, wherein a first frame of the video is subtracted from a second frame to form the first difference image.

4. The method of claim 1, further comprising resampling the second edge map to match the resolution of the first edge map.

5. The method of claim 1, wherein said imager captures IR video.

6. The method of claim 1, wherein the scene motion of the video is measured from inertial rate sensors or autocorrelation of the video.

7. A method of correlating video from an imager to reference video, comprising:
    using the temporal motion of the imager over a plurality of frames of video to form a first edge map;
    measuring scene motion of the video;
    spatially processing images in the reference video with a displace and subtract filter in accordance with the measured scene motion to locate at least some of the same edges to form a second edge map; and
    correlating the first and second edge maps to provide registration.

8. A method of correlating video from an imager to reference video, comprising:
    using the temporal motion of the imager over a plurality of frames of video to form a first edge map, where the first edge map is formed by differencing images in the video, wherein a first frame of the video is subtracted from a second frame to form the first difference image, wherein subtracting images in the video compensates DC non-uniformities in the frames of video;
    measuring scene motion of the video;
    spatially processing images in the reference video in accordance with the scene motion to locate at least some of the same edges to form a second edge map; and
    correlating the first and second edge maps to provide registration.

9. A method of correlating video from an imager to reference video, wherein said imager captures low-resolution IR video and a reference imager captures high-resolution IR reference video, comprising:
    using the temporal motion of the imager over a plurality of frames of low-resolution IR video to form a first edge map;
    measuring scene motion of the low-resolution IR video;
    spatially processing images in the high-resolution IR reference video in accordance with the scene motion to locate at least some of the same edges to form a second edge map;
    resampling the second edge map to match the resolution of the first edge map; and
    correlating the first and second edge maps to provide registration.

10. A method of correlating low-resolution video from an imager to high-resolution reference video, comprising:
    using the temporal motion of the imager over a plurality of frames of low-resolution video to delay and subtract successive frames to compensate the effects of DC non-uniformities in the frames and form a first edge map;
    estimating scene motion of the video;
    constructing a displace and subtract spatial filter based on the scene motion estimate;
    processing images in the high-resolution reference video with the displace and subtract filter to locate at least some of the same edges to form a second edge map;
    resampling the second edge map to match the resolution of the first edge map;
    correlating the first and second edge maps; and
    extracting registration information from the correlated first and second edge maps.

11. The method of claim 10, wherein said imager captures IR video.

12. The method of claim 10, wherein the scene motion of the video is estimated from inertial rate sensors or autocorrelation of the video.

13. A method of correlating video, comprising:
    capturing low-resolution video with an imager;
    capturing high-resolution reference video with a reference imager:
    using the temporal motion of the imager over a plurality of frames of low-resolution video to form a first edge map;
    measuring scene motion of the low-resolution video;
    spatially processing images in the reference video in accordance with the scene motion to locate at least some of the same edges to form a second edge map;
    resampling the second edge map to match the resolution of the first edge map; and
    correlating the first and second edge maps to provide registration.

14. The method of claim 13, wherein the reference video is spatially processed with a displace and subtract filter in accordance with the measured scene motion.

15. The method of claim 13, wherein use of the temporal motion to form the first edge map compensates DC non-uniformities in the frames of video.

* * * * *